(12) United States Patent
Suzuki et al.

(10) Patent No.: US 6,587,135 B1
(45) Date of Patent: Jul. 1, 2003

(54) CARD RECORDING APPARATUS

(75) Inventors: Yoshitaka Suzuki, Sugito-machi (JP); Satoshi Yonemitsu, Yokohama (JP)

(73) Assignee: JVC Victor Company of Japan, Ltd., Kanagawa-ken (JP)

( * ) Notice: Subject to any disclaimer, the term of this patent is extended or adjusted under 35 U.S.C. 154(b) by 0 days.

(21) Appl. No.: 09/418,653

(22) Filed: Oct. 15, 1999

(30) Foreign Application Priority Data

Oct. 16, 1998 (JP) .......................................... 10-295040
Aug. 25, 1999 (JP) .......................................... 11-238100

(51) Int. Cl.⁷ .......................... B41J 2/325; G11B 25/04
(52) U.S. Cl. ........................... 347/217; 347/171; 360/2
(58) Field of Search .................................. 347/171, 217, 347/213; 360/2; 400/120.01

(56) References Cited

U.S. PATENT DOCUMENTS 6,236,420 B1 * 5/2001 Matsuzaka ................. 347/170

FOREIGN PATENT DOCUMENTS

| JP | 8-048047 | 2/1996 |
|----|----------|--------|
| JP | 9-150592/1997 | 6/1997 |
| JP | 10-105662/1998 | 4/1998 |
| JP | 11348328 A | * 12/1999 ............... B41J/2/32 |

* cited by examiner

Primary Examiner—Regina N. Holder
Assistant Examiner—Dan I. Davidson
(74) Attorney, Agent, or Firm—Anderson Kill & CLick, P.C.; Eugene Lieberstein; Michael N. Meller

(57) ABSTRACT

The present invention provides a card recording apparatus capable of printing in high speed as well as reducing overall dimensions of the apparatus. After a card is transported to an information recording section 200 in a lateral (short length) direction of the card, an information signal is recorded on the card thereby. Then, the card is transported to a second heating section 300. An ink image formed on an intermediate recording medium 7 by a first heating section 500 is re-transferred to the card by the second heating section 300. A warp developed on the card by the second heating section 300 is corrected by a card warp correcting section 400.

5 Claims, 9 Drawing Sheets

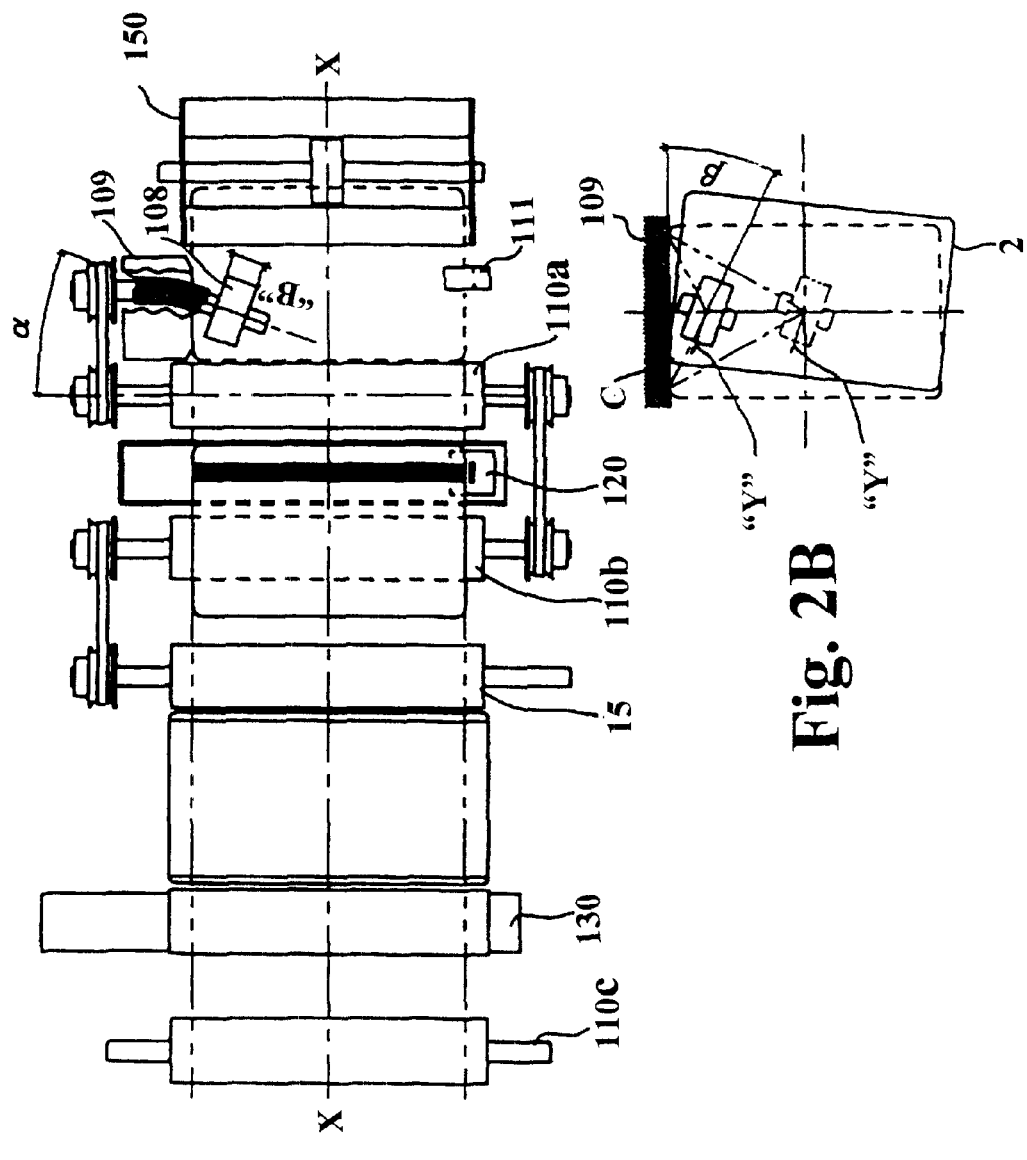
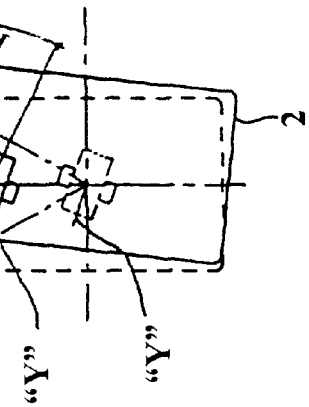

Mode A

Mode B

Mode C

CARD RECORDING APPARATUS

BACKGROUND OF THE INVENTION

1. Field of the Invention

The present invention relates to a card recording apparatus for transferring fusing or sublimating ink to a recording medium such as a credit card with magnetic stripes, for instance, specified in JIS X6301/6302 or an IC card with an external terminal, for instance, specified in JIS X6303, or a combined card thereof, and more particularly, relates to a re-transferring type card recording apparatus, wherein an ink image is once transferred to an intermediate recording medium, and is re-transferred to the recording medium from the intermediate recording medium.

2. Description of the Related Arts

There is well known a re-transferring type card recording apparatus where an ink image is once transferred to an intermediate recording medium and is re-transferred to an recording medium from the intermediate recording medium. In connection with that, various kinds of card recording apparatuses have been proposed. As an example, there is a card recording apparatus disclosed in Japanese Patent Laid-open Publication 8-48047/96. The description is given to the card recording apparatus in the prior art, referring to FIGS. 8 and 9.

FIG. 8 is a plan view of a card recording apparatus in the prior art.

As shown in FIG. 8, the card recording apparatus generally comprises an ink film 1 extended between a first supply real 6 and a first take-up real 5, an intermediate recording medium 7 extended between a second supply real 8 and a second take-up real 9, a first heating section 500 having a platen roller 4 and a thermal head 3 for transferring ink of the ink film 1 to the intermediate recording medium 7 by pressing and supporting both the ink film 1 and the intermediate recording medium 7 interposed between the thermal head 3 and the platen roller 4, and a second heating section 300 having a heating roller 14 and a pressing roller 15 for transferring an ink image formed on the intermediate recording medium 7 to a recording medium 2. The ink film 1 and the intermediate recording medium 7 are transported to the first heating section 500 in a closely adhering state. Thereby, the ink of the ink film 1 is heated, resulting in an ink image on the intermediate recording medium 7. After that, the intermediate recording medium 7 is transported to the second heating section 300. Thereby, the ink image formed on the intermediate recording medium 7 is transferred to the recording medium 2.

This kind of a thermal transfer recording apparatus is referred to as a re-transferring recording method, resulting from printing an image on the recording medium by using the intermediate recording medium 7. In addition, the apparatus has advantages to record an image on a whole surface of the recording medium 2 and to cause no problem upon recording the image even when the recording medium 2 has some unevenness thereon. Thus, this kind of apparatus is applied to an image recording for a credit card.

In such a card recording apparatus in the prior art, the card is transported in a longitudinal direction of the card. In FIG. 8, the recording medium 2 is shown as a credit card having magnetic stripes as specified in JIS X6301/6302. In order to record magnetic information along with image information on the card, it is necessary to transport the card in the longitudinal direction of the card, and to record the magnetic information on the card by using a magnetic head disposed along a traveling path of the card or by using a separate unit.

FIG. 9 is a schematic plan view for explaining an exchange of an ink film or an intermediate recording medium as a consumable article in the card recording apparatus of the prior art.

As shown in FIG. 9, constructive members located on the side of the ink film 1 in the card recording apparatus of the prior art are installed in a first unit 600. On the other hand, the constructive members including the intermediate recording medium 7 and the second supply and take-up reels 8, 9 which are located on an opposite side of the ink film 1, are installed in a second unit 700. The first and second units 600, 700 are connected by using slide members for assembling/separating them in a parallel direction.

However, in the above card recording apparatus, there are problems as follows.

(1) As the magnetic information and the image information are recorded on the card by transporting the card in the longitudinal direction thereof, a traveling path of the card becomes long, resulting in a limitation to reduce overall dimensions of the apparatus.

(2) A direction of the image printing in the second heating section 300 coincides with the longitudinal direction of the card, resulting in a difficulty to print the image at high speed.

(3) The apparatus has a constructive feature that the first and second units 600, 700 are detachably assembled by using the slide members, resulting in not only a degradation of a positional precision between the first and second units 600, 700, but also a reduction of a stiffness of the apparatus.

(4) Upon exchanging the intermediate recording medium 7 or the ink film 1, it is a difficult work to extend the intermediate recording medium 7 between the second supply reel and take-up reels 8, 9 or the ink film 1 between the first supply and take-up reels 6, 5.

(5) In the second heating section 300, the heating roller 14 is used. Thus, upon exchanging the intermediate recording medium 7 or the ink film 1, the heating roller 14 is exposed. In order to prevent an operator from being burnt with the heating roller 14, it is necessary to provide a shutter geared to the assembling/separating operations of the first and second unit 600, 700, or to apply a burning prevention treatment nearby a metal of the heating roller 14, resulting in an increment of a production cost of the apparatus.

(6) There is provided a transparent image acceptance layer on the intermediate recording medium 7 for being transferred to the recording medium 2 along with the ink image. The transparent image acceptance layer has a thickness of 1 $\mu$m. Thus, a surface of the image recorded on the recording medium 2 is easily worn.

SUMMARY OF THE PRESENT INVENTION

Accordingly, a general object of the present invention is to provide a card recording apparatus where the above disadvantages have been eliminated.

More specific object of the present invention is to provide a card recording apparatus capable of recording at high speed, of reducing the whole dimensions of the apparatus and of exchanging the consumable articles such as an ink film and an intermediate recording medium easily.

Another and more specific object of the present invention is to provide a card recording apparatus for recording image information on a surface of a card having magnetic stripes formed in a longitudinal direction thereof and for recording/reproducing magnetic information on/from the magnetic stripes, wherein the card is inserted into the card recording apparatus upon operation, the card recording apparatus comprising: transport means for transporting the card in a direction along a shorter side of the card and temporarily stopping transporting the card when the magnetic information is recorded/reproduced on/from the magnetic stripes; recording/reproducing means capable of being transported in a longitudinal direction of the card for recording/ reproducing magnetic information on/from the magnetic stripes of the card when the card is stopped, and image information recording means for recording image information on the card along the lateral direction of the card.

Other specific of the present invention is to provide a card recording apparatus for recording image information on a surface of a card provided with an IC having an outer terminal and for recording/reproducing information in/from the IC of the card, wherein the card is inserted into the card recording apparatus upon operation, the card recording apparatus comprising: transport means for transporting the card in a lateral direction of the card and temporarily stopping transporting the card when the information is recorded/reproduced in/from the IC of the card through the outer terminal; recording/reproducing means capable of being transported in a longitudinal direction of the card for recording/reproducing the information in/from the IC of the card through the outer terminal when the card is stopped, and image information recording means for recording image information on the card along the lateral direction of the card.

Other specific object of the present invention is to provide a card recording apparatus comprising: an ink film having a tape-like base film coated with a sublimate ink or a defusing ink thereon, the ink film being extended between a first supply reel and a first take-up reel; an intermediate recording medium having a transparent image acceptance layer separably provided on a base sheet, the intermediate recording medium being extended between a second supply reel and a second take-up reel; a first heating section for transferring the ink of the ink film to the transparent image acceptance layer of the intermediate recording medium so as to form an ink image thereon by heating the ink of the ink film with the first heating section after the intermediate recording medium and the ink film closely attached to each other are transported thereto, and a second heating section for transferring the ink image along with the transparent image acceptance layer to the recording medium by heating the intermediate recording medium with the second heating section after the intermediate recording medium having the ink image is transported to the second heating section, wherein the transparent image acceptance layer without the ink image is transferred again to the recording medium after the ink image together with the transparent image acceptance layer is transferred to the recording medium.

BRIEF DESCRIPTION OF THE DRAWINGS

FIG. 2A is a sectional view of the card recording apparatus along a II—II line shown in FIG. 1;

FIG. 2B is a partial view of FIG. 2A;

DETAILED DESCRIPTION THE PREFERRED EMBODIMENTS

A card recording apparatus of the present invention is applied to recording image information on surfaces of recording mediums such as a card provided with magnetic stripes formed in a longitudinal direction of the card for recording/reproducing magnetic information, and a card provided with an IC having an outer terminal for recording/ reproducing information other than the image information.

The description is given of an embodiment of a card recording apparatus of the present invention referring to FIGS. 1 to 7.

Figure 1:
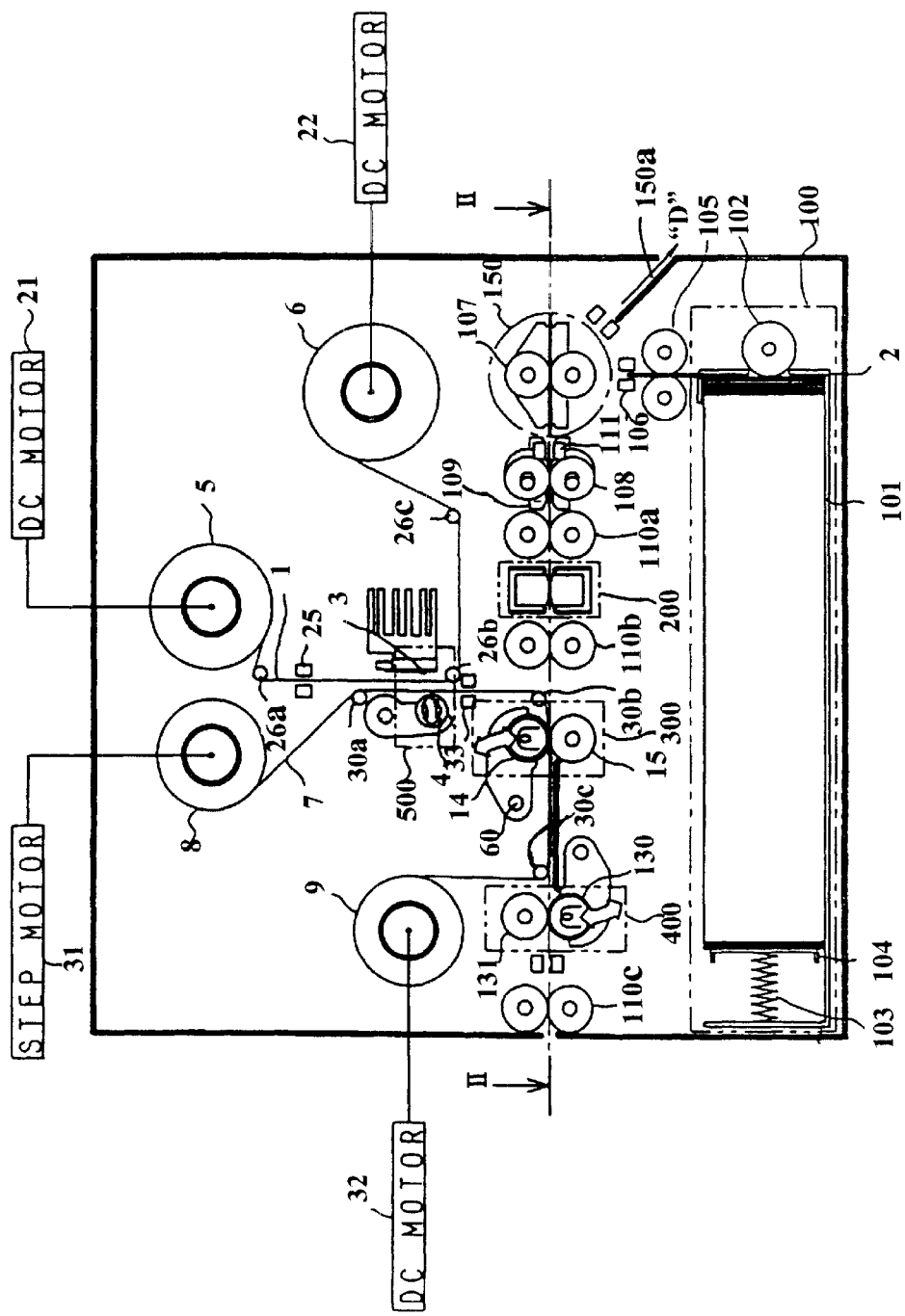
FIG. 1 is a plan view showing a card recording apparatus of the present invention.
Figure 3:
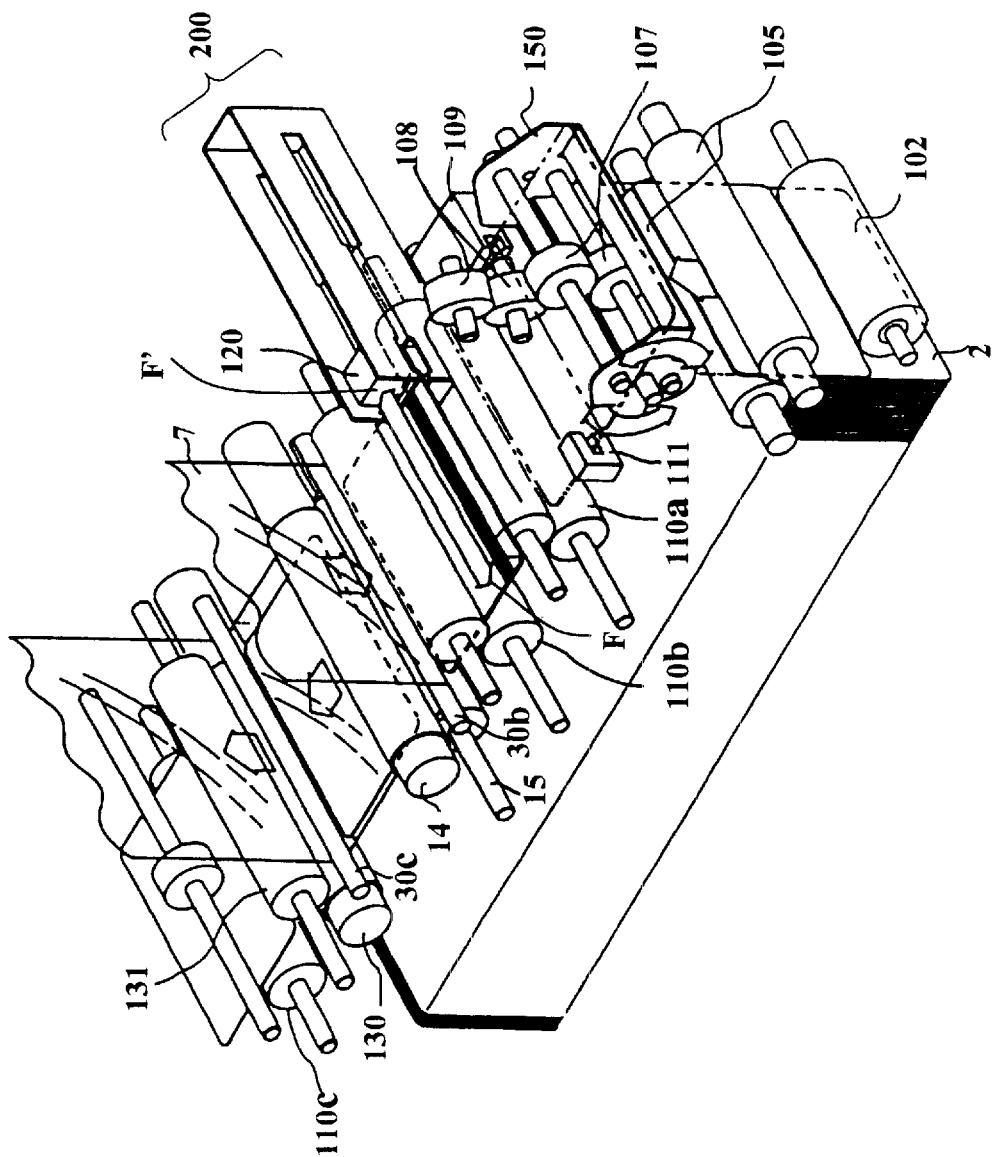
FIG. 3 is a partial perspective view of the card recording apparatus of the present invention.
Figure 4:
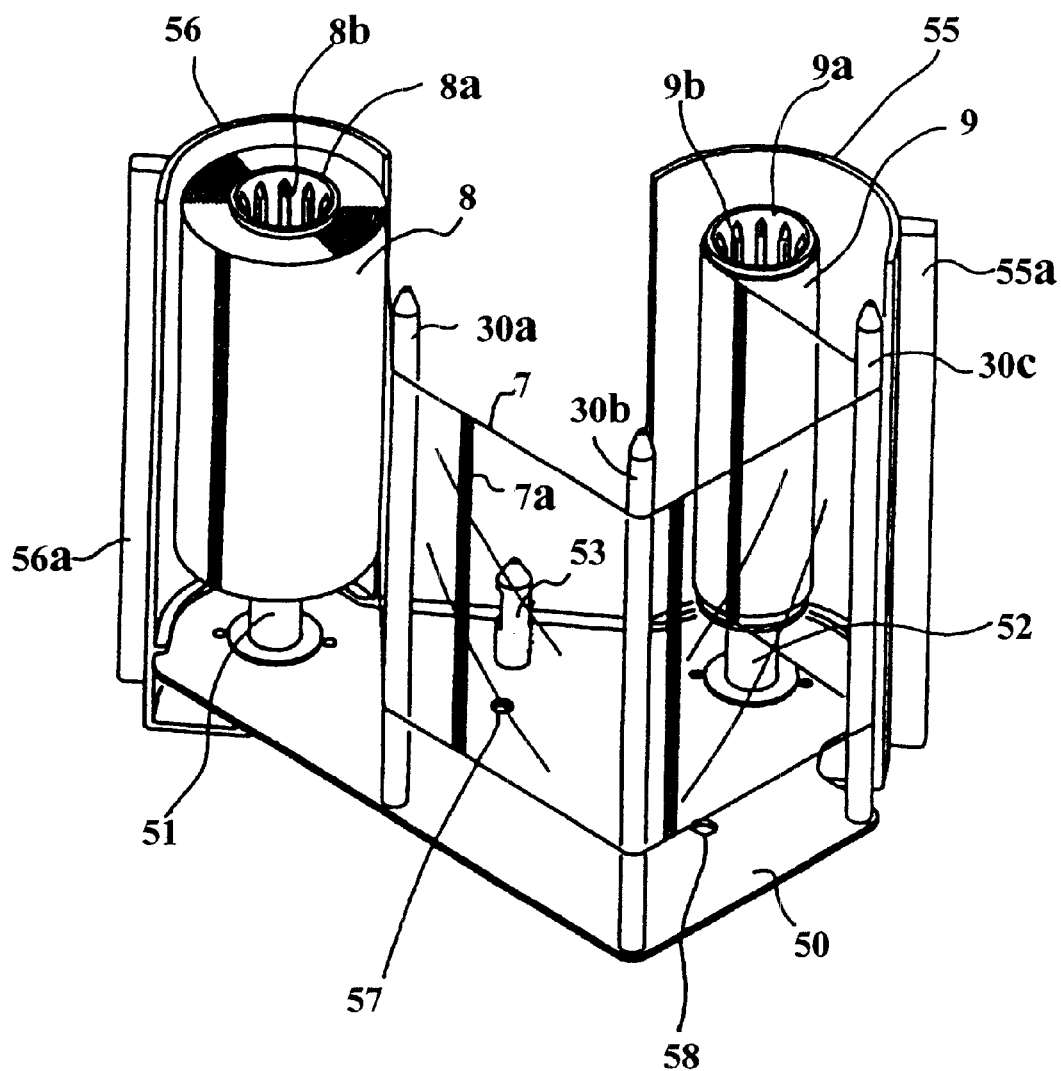
FIG. 4 is a perspective view of a cassette with respect to an intermediate recording medium in the present invention.
Figure 5:
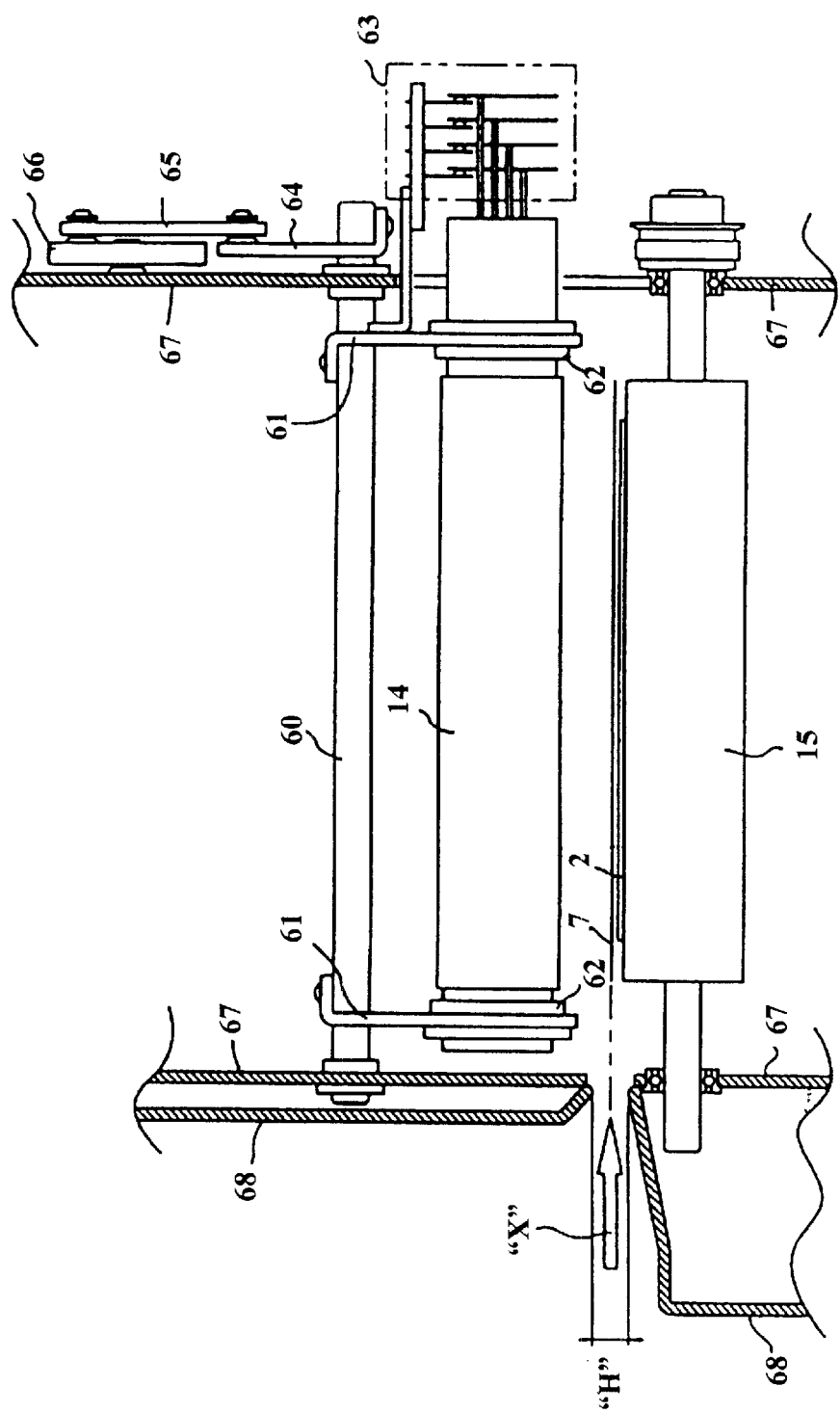
FIG. 5 is a sectional view of a second heating section of the card recording apparatus in the present invention.
Figure 6:
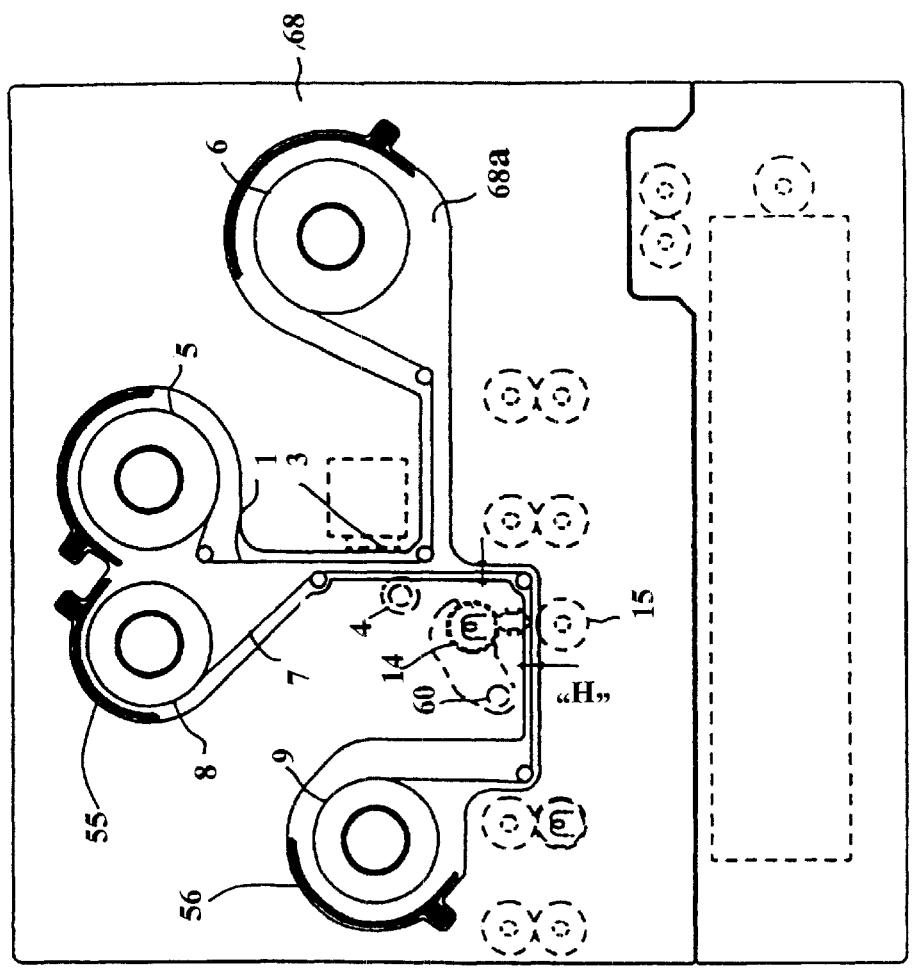
FIG. 6 is a plan view showing an outlook of the card recording apparatus of the present invention.
Figure 7A:
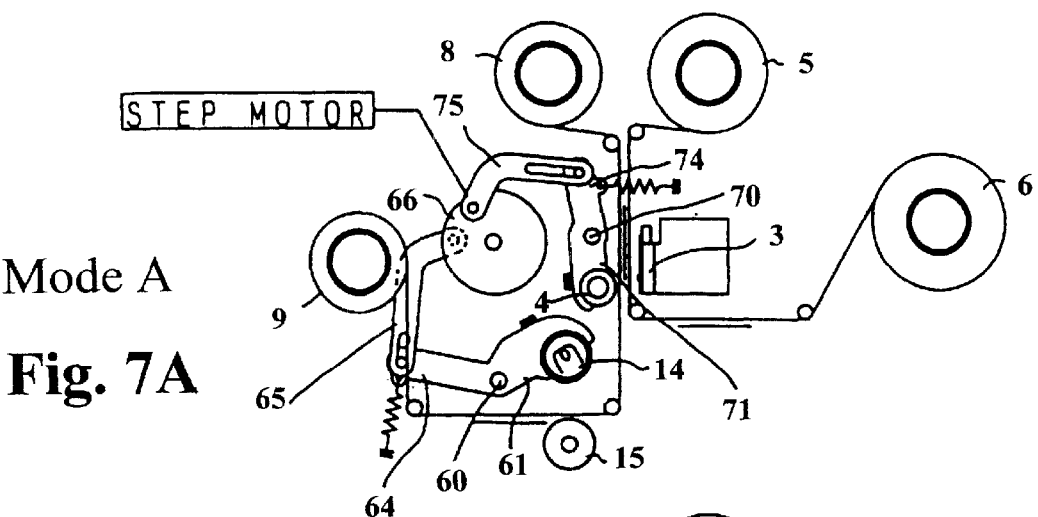
FIGS. 7A to 7C are schematic views for explaining roller mode switching operations of first and second heating sections of the present invention.
Figure 7B:
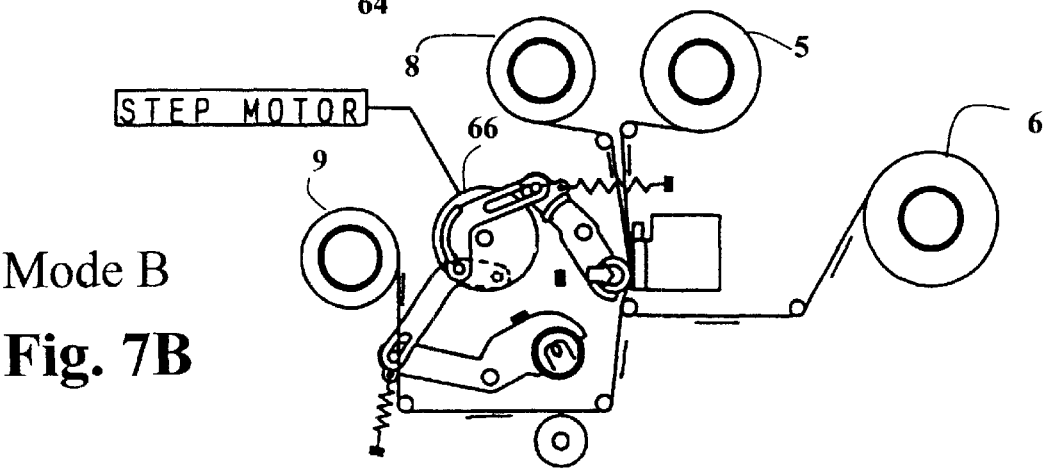
Figure 7C:
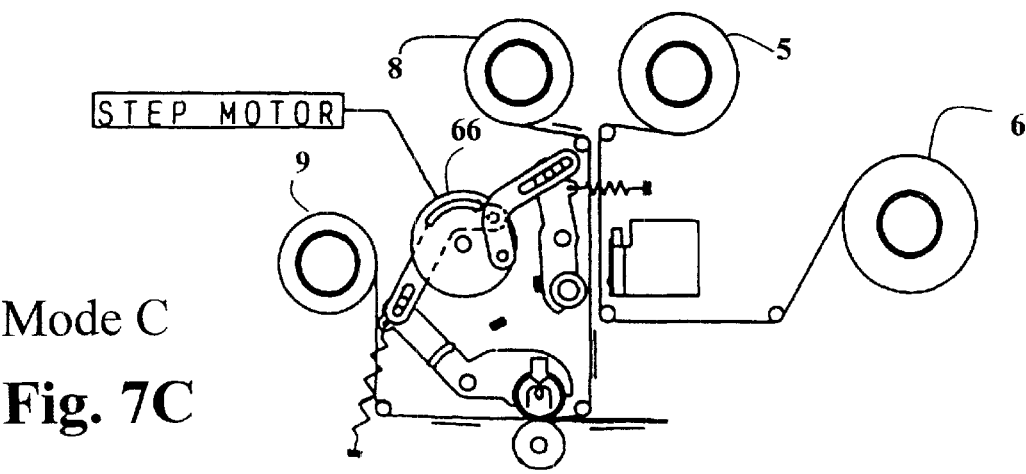
Figure 8:
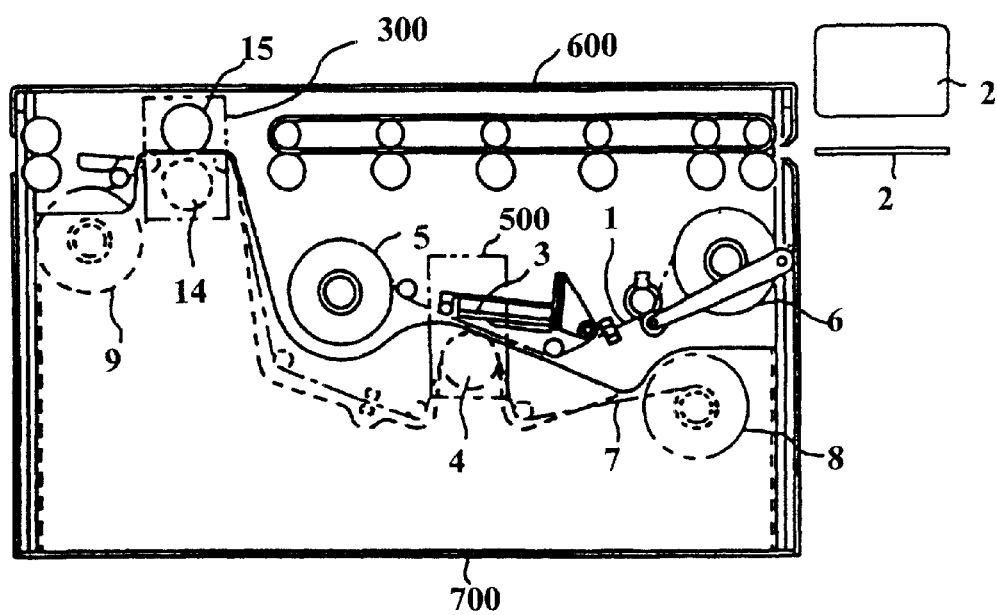
FIG. 8 is a plan view of a card recording apparatus in the prior art.
Figure 9:
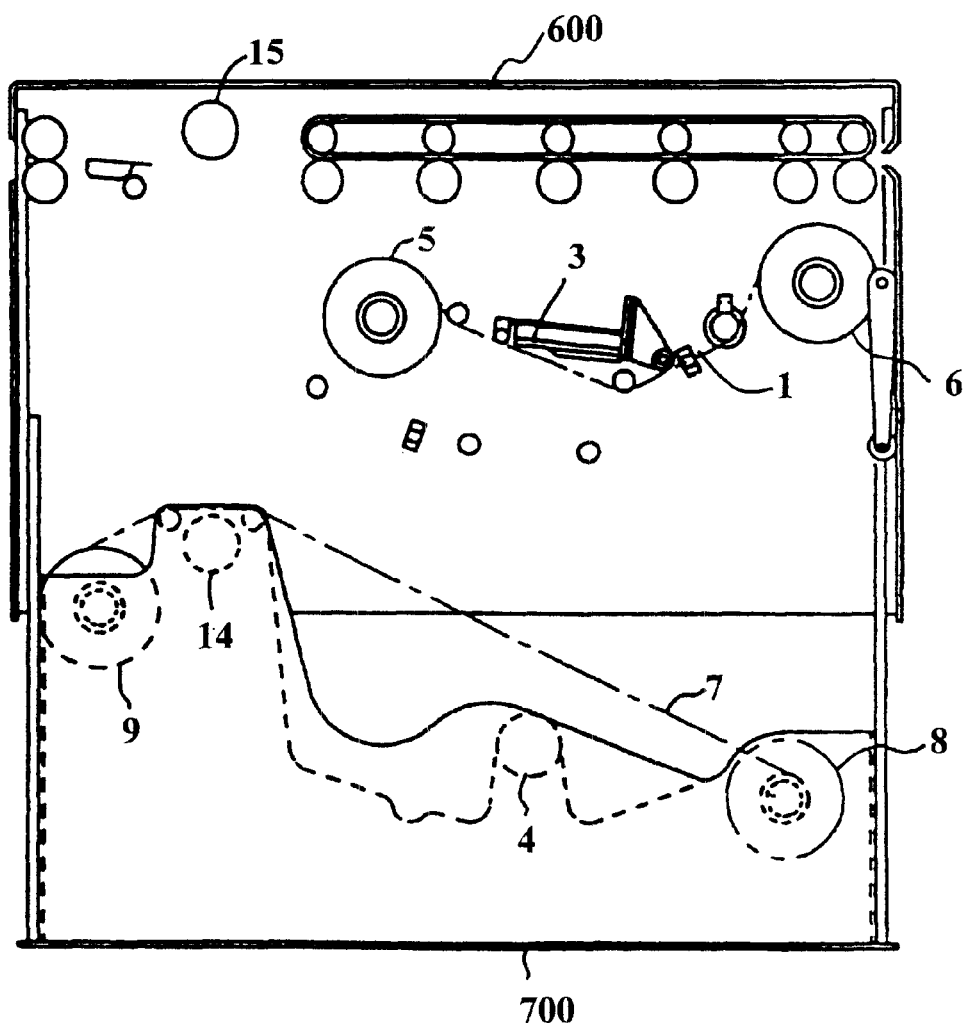
FIG. 9 is a schematic plan view for explaining an exchange of an ink film or an intermediate recording medium as a consumable article in the card recording apparatus of the prior art.

FIG. 1 is a plan view showing a card recording apparatus of the present invention;

FIG. 2A is a sectional view of the card recording apparatus along a II—II line shown in FIG. 1;

FIG. 2B is a partial view of FIG. 2A;

FIG. 3 is a partial perspective view of the card recording apparatus of the present invention;

FIG. 4 is a perspective view of a cassette with respect to an intermediate recording medium in the present invention;

FIG. 5 is a sectional view of a second heating section of the card recording apparatus in the present invention;

FIG. 6 is a plan view showing an outlook of the card recording apparatus of the present invention, and FIGS. 7A to 7C are schematic views for explaining roller mode switching operations of first and second heating sections of the present invention.

First, the description is given of a construction of the card recording apparatus in the present invention.

Referring to FIG. 1, an ink film 1 is extended between a first supply reel 5 and a first take-up reel 6 in such a manner that ink coated on the surface of the ink film 1 faces to a platen roller 4. The ink film 1 comprises a tape base film on which three kinds of color-ink, i.e., yellow (Y), magenta (M) and cyan (C), or four kinds of color-ink, i.e., yellow (Y), magenta (M), cyan (C) and black (K), are periodically coated by causing them to be in one frame.

DC motors 21, 22 as a driving source for transporting the ink film 1 are respectively connected to the first supply and take-up reels 5, 6 through a reducer (not shown). Each of the DC motors 21, 22 includes an encoder for detecting an angle of rotation and a number of revolution.

The DC motor 21 attached to the first supply reel 5 can be driven in a reverse rotational direction of the first supply reel 5 so as to wind back the ink film 1 or to give a back tension to the first supply reel 5.

Further, the first supply reel 5 is given a constant back tension by changing an amount of voltage applied to the DC motor 21 in accordance with a remaining quantity of the ink film 1 of the first supply reel 5.

The detection of the remaining quantity (a roll radius) of the ink film 1 is calculated by detecting an angle of rotation of the DC motor 21 which corresponds to a length of one frame of the ink film 1 passing over a sensor 25 mentioned hereinafter.

Likewise, the DC motor 22 attached to the first take-up reel 6 is driven so as to take-up the ink film 1 as well as giving an appropriate tension to the ink film 1 by applying a voltage thereto corresponding to a roll radius of the ink film 1. Further, a transport amount of the ink film 1 is controlled by detecting it with an encoder (not shown) built into the DC motor 21 or 22.

On a base film side of the ink film 1, a thermal head 3 as the first heating section 500 is fixedly disposed. On the other hand, on an ink film side thereof, a platen roller 4 is movably disposed so that it presses the thermal head 3 and separates therefrom. Along a traveling path of the ink film 1, there is provided a sensor 25 for detecting a head of Y (yellow) ink of the ink film 1. However, a head detection of ink (M, C and K) other than Y ink is performed by using the encoder built into the DC motor 21 or 22. As the sensor 25, ones capable of detecting a detection mark or a color boundary between different colors may be used. Further, the ink film 1 is taken-up by the first take-up reel 6 being guided by guide members 26a to 26c.

The intermediate recording medium 7 comprises a tape base sheet (not shown), a transparent image acceptance layer (not shown) provided on the tape base sheet and a spalling layer provided between the tape base sheet and the transparent image acceptance layer for spalling the transparent image acceptance layer from the tape base sheet. Every frame recording, a detection mark is printed on the intermediate recording medium 7, and is extended between a second supply reel 8 and a second take-up reel 9 in such a manner that the transparent image acceptance layer faces to the ink film 1.

A pulse motor 31 as a driving source for transporting the intermediate recording medium 7 is attached to the second supply reel 8 through a reducer (not shown), a DC motor 32 is attached to the second take-up reel 9 through another reducer. The DC motor 32 attached to the second take-up reel 9 contains an encoder for detecting an angle of rotation and a number of revolutions of the DC motor 32.

The intermediate recording medium 7 supplied from the second supply reel 8 is taken-up by the second take-up reel 9 being guided by a guide member 30a, via the platen roller 4, a sensor 33 for detecting a head of a frame of the intermediate recording medium 7, guided by another guide member 30b, and passing through between the heating roller 14 and a pressing roller 15 and further guided by other guide member 30c.

Thus, the transparent image acceptance layer of the intermediate recording medium 7 faces to ink of the ink film 1 between the thermal head 3 and the platen roller 4. Further, the heating roller 14 is possible to press a pressing roller 15 and is separable from the pressing roller 15.

The ink film 1 and the intermediate recording medium 7 mentioned above have a cassette shape, respectively. As an example, the detailed description is given of a cassette 900 of the intermediate recording medium 7 referring to FIG. 4.

On a base plate 50 corresponding to a base of the cassette 900, the respective guide members 30a, 30b, 30c mentioned in the foregoing are disposed at a predetermined position. Thus, the intermediate recording medium 7 is extended along a predetermined traveling path between the second supply reel 8 and the second take-up reel 9.

Bobbins 8a, 9a to be cores of the second supply and take-up reels 8, 9 are rotatably fitted in bobbin receivers 51, 52 provided on the base plate 50, and they can be disconnected therefrom to allow the intermediate recording medium 7 to be exchanged. On the other hand, there are provided recesses 8b, 9b in the bobbins 8a, 9a on opposite sides of the bobbin receivers 51, 52 for transmitting a driving power when a reel driving shaft (not shown) of the apparatus is fitted to the recesses 8b, 9b, respectively.

Further, on the base plate 50, there are provided a lock pin 53 for locking the cassette 900, a pair of covers 55, 56, each including a guide section 55a, (56a), respectively, for guiding the cassette 900 into the card recording apparatus along guide members provided in the apparatus when the cassette 900 is installed therein. Further, there are formed positioning holes 57, 58 thereon for positioning the cassette 900 precisely in the apparatus by being engaged with positioning pins (not shown) of the apparatus. In addition, distal ends of the guide members 30a, 30b, 30c are fitted into holes (not shown) formed on the apparatus side so as to be precisely positioned.

In FIG. 4, a reference character 7a designates a frame detection mark of the intermediate recording medium 7. Thereby, the position of the frame where an ink image is formed, can be detected when the ink image is formed on the intermediate recording medium 7.

It should be noted that a cassette for the ink film 1 has the same shape as the cassette 900 for the intermediate recording medium 7. Thus, the detailed description is omitted here for simplicity. Hereinafter, the above mentioned cassettes 900 are referred to as an intermediate recording medium cassette 900 and the cassette for the ink film 1 is referred to as an ink film cassette 900a, hereinafter.

Next, referring to FIGS. 5 to 7, the description is given of the second heating section 300 and its peripheral construction.

The heating roller 14 is provided so as to press and separate from the pressing roller 15. A driving mechanism of the heating roller 14 comprises a pair of first arms 61, 61, a rotary shaft 60 on which the pair of the first arms 61, 61 are fixed, capable of rotating along with the pair of the first arms 61, 61, a second arm 64 provided on the rotary shaft 60 for rotating the rotary shaft 60, a link 65 connected to the second arm 64 for transmitting a torque to the second arm 64, a cam 66 connected to the link 65 for converting a rotary torque to a propulsion force and transmitting it to the link 65, and a stepping motor (not shown) for driving the cam 66 through a reducer. Incidentally, the heating roller 14 is rotatably supported by the pair of the first arms 61, 61 through a pair of bearings 62, 62 provided therebetween.

Next, an explanation is given of a construction of the heating roller 14. The heating roller 14 generally comprises a cartridge heater (not shown) and such an elastic body as silicon gum coated on the cartridge heater. The cartridge heater comprises a metal cylinder, a nichrome wire coiled around an insulation core sealed in the metal cylinder along with a thermocouple for detecting an inner temperature of the heating roller 14. Further, there is provided a slip ring 63 at one end of the heating roller 14 for allowing the nichrome wire and the thermocouple which are rotated upon operation, to be electrically connected to outside devices.

The optimum temperature of the surface of the heating roller 14 depends on a kind of material of a card as the recording medium to be used. However, it is approximately established within a range of 150 to 200° C. The optimum temperature is controlled by energizing or deenergizing the nichrome wire with a temperature control circuit based on a detected temperature from the thermocouple. Further, the heating roller 14 and the pressing roller 15 are supported by a chassis 67, and the intermediate recording medium 7 extended in the intermediate recording medium cassette 900 is installed into an opening section 68a defined in a case 68 in a direction shown with an arrow "X". In FIG. 5, a width "H" of the opening section 68 defined in the chassis 67 and the case 68 is established to be not more than 10 mm so as to prevent fingers of the operator from being inserted. In FIG. 5, a reference character 2 designates a card as the recording medium, and an ink image formed on the intermediate recording medium 7 is thermally printed on the card 2 by stacking the intermediate recording medium 7 on the card 2.

FIG. 6 is a plan view showing an outline of a case of the card recording apparatus of the present invention.

As shown in FIG. 6, there is formed the opening section 68a in the case 68 for installing the intermediate recording cassette 900 and the ink film cassette 900a. The width "H" of the opening section 68a nearby the second heating section 300 is established to be not more than 10 mm as mentioned in the foregoing.

The opening section 68a is generally defined with first and second opening sections. The first opening section defines a curved line opening section formed along an outer curved line of each of the intermediate recording medium cassette 900 and the ink film cassette 900a. The second opening section defines a straight line opening section formed along an extended path of each of the ink film 1 and the intermediate recording medium 7.

Further, the description is given of a mode switching operation of the heating roller 14 and the platen roller 4, referring to FIGS. 7A to 7C.

As mentioned in the foregoing, the heating roller 14 is pressed or separated to or from the pressing roller 15 in cooperation with the rotation of the cam 66. On the other hand, the platen roller 4 is pressed or separated to or from the thermal head 3.

The driving mechanism of the platen roller 4 is basically the same as that of the heating roller 14. Specifically, the driving mechanism of the platen roller 4 comprises a pair of first arms 71 (71) provided at both ends of the platen roller 4, a rotary shaft 70 on which the pair of first arms 71 are fixed so as to be rotated together with the rotary shaft 70, a second arm 74 provided at the rotary shaft 70 for rotating the rotary shaft 70, a rink 75 for transmitting a rotary torque to the second arm 74, and a cam 66 for converting a rotary torque to a propulsion force and transmitting it to the link 75, and a stepping motor (not shown) for rotating the cam 66 through a reducer(not shown).

The pressing and separating operations of both the heating roller 14 and the platen roller 4 are performed by changing an angle phase of the cam 66. The three modes A/B/C of the cam 66 are shown in FIGS. 7A, 7B and 7C, respectively.

Specifically, in a mode A shown in FIG. 7A, not only the heating roller 14 is separated from the pressing roller 15 but also the platen roller 4 is separated form the thermal head 3. In a mode B shown in FIG. 7B, the heating roller 14 is separated from the pressing roller 15 while the platen roller 4 is pressed to the thermal head 3. In a mode C shown in FIG. 7C, the heating roller 14 is pressed to the pressing roller 15 while the platen roller 4 is separated from the thermal head 3.

Next, the description is given of a transportation structure and an operation of the recording medium in the present invention, referring to FIGS. 1, 2 and 3.

Referring to FIG. 1, a hopper section 100 for storing a plurality of recording mediums (referred to as a card hereinafter) 2 is detachably provided on the card recording apparatus. In a case 101 of the hopper section 100, a plurality of cards 2 are arranged in a stack a manner that they stand upright in a lateral (short length) direction of the card 2 to a horizontal plan (a drawing surface of FIG. 1). In FIG. 1, a thickness of the card on a lateral length thereof is illustrated. The hopper section 100 comprises the case 101 provided with a gate to allow one of the plural cards 2 to be discharged, a pick-up roller 102 for transporting the card 2 to the gate, a spring 103 for forcibly biasing the plural cards 2 to the pick-up roller 102 through a pressing plate 104. The hopper section 100 has a detachable construction to allow itself to be pulled out in a front direction of the card recording apparatus.

Further, nearby the hopper section 100, there are provided a pair of cleaning rollers 105 for removing dust attached on the card 2 fed from the hopper section 100, a sensor 106 for detecting the card 2 fed from the cleaning rollers 105, and a card reversing section 150 provided with a pair of card transport rollers 107 for changing a card transport direction by being rotated together with the pair of card transport rollers 107 pinching the card 2.

The card reversing section 150 has phases of rotation of four modes as follows.

(1) accepting the card 2 transported from the hopper section 100.
(2) giving the card 2 to card transport rollers of downstream.
(3) reversing the card 2 upside down.
(4) discharging an encode error card in a direction shown with an arrow "D", in case that the encode error card are detected in an information recording section as mentioned hereinafter.

This card reversing section 150 is disposed nearby an end side of the apparatus. Thus, it is possible to discharge the card 2 from an encode error card discharging outlet 150a without using extra components by slanting the encode error card discharging outlet 150a in a direction shown with an arrow "D".

Next, the description is given of a following traveling path of the card 2, referring to FIGS. 2A and 2B.

As shown in FIG. 2A, a pair of card transport rollers 108 (108) (though only one of them is shown here) are disposed so that they have a slant angle "α" of 10 to 40 degree to respective rotary axes of card transport rollers 110a, 10b, 110c. Further, a card contacting length (a roller length) "B" of the card transport rollers 108 is made to be not more than 15 mm, and is disposed to be contacted with the card 2 on a side of a card guide 109 or an upper side higher than a center line X—X.

Thereby, it is possible to transport the cord 2 smoothly even when the card transport direction is made to be a lateral direction of the card 2. Specifically, when the card 2 is transported obliquely by the card transport roller 108, a posture of the card 2 is corrected in such a manner that an edge "C" of the card 2 abuts against the card guide 109. Referring to FIG. 2B, in this case, when an angle β is substantially small and the card contacting length "B" of the card transport roller 108 is comparatively small, the card 2 can be readily rotated around the edge C thereof, resulting in no damage developed on the edge "C" of the card 2 even when a thin card is employed as the card 2. On the contrary, when the card contacting length "B" is made to be comparatively large, the transporting force "Y" of the card 2 becomes large one, however, a force to interfere the rotation of the card 2 becomes large one, resulting in an adverse effect such as a damage developed on the edge "C" of the card 2.

The card 2 of which posture has been corrected, is passed to the following card transport rollers 110a by driving a step motor (not shown) for driving the card transport rollers 110a. When a distal end of the card 2 has been detected by a card sensor 111, a step number of the step motor is begun to count. The driving of the step motor is stopped depending on a predetermined count number.

This predetermined count number is determined based on the position of the information recording section 200 and a position of the magnetic stripes or the outer terminal of the cards and an alignment direction of the card 2 in the case 101 of the hopper section 100. Thus, the card 2 is held at a position of the card transport roller 110a or 110b.

Incidentally, the card transport rollers 110a and 110b are made of an elastic body such as a rubber having a large coefficient of friction or an excellent nip characteristic. Thus, it is possible to perform a reliable recording of the card 2 because the card transport rollers 110a, 10b can exert sufficient holding force to the card 2 and excellent absorption of oscillation thereof upon recording.

In JIS X6302 (MAGNETIC INFORMATION RECORDING MODES OF CREDIT CARDS WITH MAGNETIC STRIPES) there are specified two types of magnetic heads corresponding to [I type] and [II type], and in JIS X6303 (PHYSICAL CHARACTERISTICS OF IC CARD WITH OUTER TERMINAL) there is specified a contact section, as a recording/reproducing element.

In the information recording section 200, one or two kinds of recording/reproducing elements may be installed solely or in combination by being selected among the recording/ reproducing elements mentioned above and located on an upper side of the traveling path of the card 2 or on both the upper side and the lower side thereof.

Referring to FIG. 3, the information recording section 200 is provided so that it is possible to slide in directions F, F' shown with double headed arrows which corresponds to a longitudinal direction of the card 2 as well as a recording direction of magnetic stripes thereof. In this embodiment the information recording section 200 provided with a magnetic head 120 is always retracted on the upper side of the traveling path of the card 2. Upon recording/reproducing magnetic information on/from the card 2, the information recording section 200 slides in the direction F to scan the card 2 held at a predetermined positioned along the recording direction of the magnetic stripes of the card 2, with the magnetic head 120.

On the other hand, when the contact section (not shown) mentioned above is employed as the recording/reproducing element in the information recording section 200, the information recording section 200 slides in the direction F so as to cause the contact section to electrically connect with the outer terminals for the IC of the card 2 held at a predetermined positioned, resulting in recording/reproducing of information in/from IC of the card 2.

The card 2 on/from which the magnetic information is not normally recorded/reproduced by the information recording section 200, is returned to the card reversing section 150 and is discharged from the encode error card discharging outlet 150a. The card 2 having completed the recording/ reproducing is transported to the second heating section 300, where the card 2 and the intermediate recording medium 7 are superimposed between the heating roller 14 and the pressing roller 15, and are integrally pressed and heated. Thereby, the ink image is transferred to the card 2 from the intermediate recording medium 7.

Here, a distance from the nip position defined by the pressing roller 15 and the heating roller 14 to the guide member 30c is made to be larger than a lateral length of the card 2. The reason is that according to experience of the present inventors, a good result is obtained when the card 2 is separated from the intermediate recording medium 7 at a temperature as low as possible. Thus, the abovementioned construction enables the card 2 to be sufficiently cooled down by holding the card 2 for a predetermined time after an distal end of the card 2 has been separated from the nip position, resulting in an excellent printed image.

The card 2 attached to the intermediate recording medium 7 is transported to the guide member 30c, and is separated at the position of the guide member 30c as mentioned above. Then, the card 2 is successively transported to a card warp correcting section 400 shown in FIG. 1, wherein a warp of the card 2 is corrected. The card warp correcting section 400 comprises a heating roller 130 having the same shape as that of the heating roller 14 used in the second heating section 300 and a pressing roller 131. The heating roller 130 is provided in separating and pressing manners to face an opposite surface of the image transfer surface of the card 2. The thermal contraction developed in the image transfer process of the second heating section 300 is eliminated by heating the opposite surface of the image transfer surface of the card 2. The card 2 having passed through the card warp correcting section 400 is discharged out from the card recording apparatus through card discharging rollers 110c.

As mentioned above, in the construction of the card transport section, there is disposed the hopper section 100 at a lowest position for transporting the card 2 one by one in an upper direction by causing a lateral direction of the card 2 to be a transport direction. And, there are disposed other sections over the hopper section 100 in order, i.e., the card reversing section 150 for holding the card 2 transported therein and changing a transport direction of the card 2, the information recording section 200 for recording/reproducing information on/from the information recording section of the card 2 by stopping the card 2 at a predetermined position, and the second heating section 300 for transferring an image on the card 2 at an upper position of the hopper 100 in the apparatus.

Next, the detailed description is given of the processes from the process for forming an ink image on the intermediate recording medium 7 to the process for transferring the ink image on the card 2 from the intermediate recording medium 7.

When the intermediate recording medium 7 is taken-up with the second take-up roller 9 by rotating the step motor 31 and the DC motor 32, the detecting marks 7a formed at a predetermined interval are detected by the mark sensor 33. Depending on the results thereof and a changed amount of each roll diameter, a driving frequency of the step motor 31 and a voltage applied to the DC motor 32 are established.

After a positional adjustment between the frame of the intermediate recording medium 7 and a heading color (a first color) of the ink film 1 are performed, the ink film 1 and the intermediate recording medium 7 are transported being superimposed between the platen roller 4 and the thermal head 3. The platen roller 4 is not rotated by an outer rotational force, but rotates itself due to a friction force acting thereon from running of the intermediate recording medium 7.

In this state, the ink of the ink film 1 is transferred to the image accepting layer of the intermediate recording medium 7 by causing the ink thereof to melt or sublimate by providing a predetermined current to the thermal head 3. Upon forming a color ink image on the intermediate recording medium 7, each color ink is successively superimposed in turn with three or four strokes of the intermediate recording medium 7.

After forming the ink image, the transport of the intermediate recording medium 7 and the ink film 1 is stopped, (wherein the step motor 31 is maintained in a holing state, while the DC motor is driven to give an appropriate tension to the intermediate recording medium 7), and the platen roller 4 is separated form the thermal head 3.

Next, the intermediate recording medium 7 is taken-up with the second take-up reel 9 by driving the step motor 31, while a pulse number of the step motor 31 is being counted. Then, the step motor 31 is stopped at a predetermined count number of the pulse. This pulse number can be calculated from a used driving frequency of the step motor 31 and a distance between the first heating section 500 and the second heating section 300.

Here, after the card 2 is transported at the nip position defined between the heating roller 14 and the pressing roller 15, the ink image formed on the intermediate recording medium 7 is transferred to the card 2 by pressing the card 2 and the intermediate recording medium 7 with the heating roller 14 and by simultaneously rotating the pressing roller 15 to transport the intermediate recording medium 7 together with the card 2. After the completion of the image transfer, the heating roller 14 is separated from the pressing roller 15.

Upon transferring ink images on both surfaces of the card 2, the card 2 attached to the intermediate recording medium 7 is transported backward and is separated at a position of the guide member 30b from the intermediate recording medium 7. Further, the card 2 is transported to the card reversing section 150 through the card transport rollers 110b, 110c. Thereby, the card 2 is reversed by being rotated by 180 degree. Through the same processes as mentioned above, the ink image is transferred again to the card 2.

In this case, the thermal contraction is not developed on the card 2 because both surfaces of the card 2 are heated. Thus, the heating roller 130 of the card warp correcting section 400 is omitted. The card 2 transferred with the ink image is discharged out from the apparatus through the card transport roller 110c as mentioned in the foregoing.

Incidentally, antiwear qualities of the ink image on the card 2 can be enhanced by transferring the transparent image accepting layer without the ink image several times on the ink image of the card 2. Specifically, it can be done by transferring the transparent image accepting layer having no ink image on the ink image by sparing the ink image forming process using the first heating section 500 or without energizing the thermal head 3. In this case, the card is transported backward and forward directions on the card traveling path for each transferring of the transparent image accepting layer having no ink image.

As mentioned in the foregoing, according to the card recording apparatus of the present invention, it is possible to provide a card recording apparatus capable of not only recording an image signal on the card in high speed but also reducing the dimensions of the apparatus easily because a transport direction of the card is made to be a lateral direction thereof.

Further, an intermediate recording medium and an ink film as consumable members are respectively provided in a cassette and the cassette is detachably installed in the apparatus through an opening section defined in the apparatus, resulting in a realization of an easy exchange of the consumable members.

Furthermore, upon exchanging the consumable members, a heat roller is not exposed from the opening. This fact enables to exchange the consumable members securely without providing an additional shatter and a coating treatment on metals of the heat roller.

Further, a transparent image acceptance layer having no ink image is transferred on the recording layer after an ink image is formed on the recording medium, resulting in an enhancement of antiwear qualities of the recorded image.

What is claimed is:

1. A card recording apparatus for recording image information on a surface of a card having magnetic stripes formed in a longitudinal direction thereof and for recording/reproducing magnetic information on/from the magnetic stripes, wherein the card is inserted into the card recording apparatus upon operation, the card recording apparatus comprising:

transport means for transporting the card in a lateral direction of the card and temporarily stopping a transportation of the card when the magnetic information is recorded/reproduced on/from the magnetic stripes;

recording/reproducing means capable of being transported in a longitudinal direction of the card for recording/reproducing magnetic information on/from the magnetic stripes of the card when the card is stopped, and image information recording means for recording image information on the card along the lateral direction of the card.

2. A card recording apparatus as claimed in claim 1, wherein the image information recording means comprises:

an ink film having a tape-like base film coated with a sublimate ink or defusing ink thereon, the ink film being extended between a first supply reel and a first take-up reel;

an intermediate recording medium having a transparent image acceptance layer separably provided on a base sheet, the intermediate recording medium being extended between a second supply reel and a second take-up reel;

a first heating section for transferring the ink of the ink film to the intermediate recording medium so as to form an ink image thereon;

a second heating section for transferring the ink image formed on the intermediate recording medium to the card;

a first cassette for accommodating, at least, the first supply and take-up reels and the ink film;

a second cassette for accommodating, at least, the second supply and take-up reels and the intermediate recording medium; and an opening section defined in a chassis for detachably inserting both the first and second cassettes on the chassis, the opening section being defined with first and second opening sections, the first opening section defining a curved line opening section formed along an outer curved line of each of the first and second cassettes, the second opening section defining a straight line opening section formed along an extended path of each of the ink film and the intermediate recording medium, wherein the ink image is formed on the intermediate recording medium by transporting the intermediate recording medium and the ink film closely attached to each other to the first heating section and by heating the ink of the ink film with the first heating section, and the ink image formed on the intermediate recording medium is transferred to the recording medium by transporting the intermediate recording medium to the second heating section and by heating the intermediate recording medium with the second heating section.

3. A card recording apparatus as claimed in claim 2, wherein the second heating section further comprises a heating roller, the heating roller being detracted away from the opening section in a period when no ink image is transferred to the recording medium.

4. A card recording apparatus for recording image information on a surface of a card provided with an IC having an outer terminal and for recording/reproducing information in/from the IC of the card, wherein the card is inserted into the card recording apparatus upon operation, the card recording apparatus comprising:

transport means for transporting the card in a lateral direction of the card and temporarily stopping a transportation of the card when the information is recorded/reproduced in/from the IC of the card through the outer terminal;

recording/reproducing means capable of being transported in a longitudinal direction of the card for recording/reproducing the information in/from the IC of the card through the outer terminal when the card is stopped, and image information recording means for recording image information on the card along the lateral direction of the card.

5. A card recording apparatus as claimed in claim 4, wherein the image information recording means comprises:

an ink film having a tape-like base film coated with a sublimate ink or defusing ink thereon, the ink film being extended between a first supply reel and a first take-up reel;

an intermediate recording medium having a transparent image acceptance layer separably provided on a base sheet, the intermediate recording medium being extended between a second supply reel and a second take-up reel;

a first heating section for transferring the ink of the ink film to the intermediate recording medium so as to form an ink image thereon;

a second heating section for transferring the ink image formed on the intermediate recording medium to the card;

a first cassette for accommodating, at least, the first supply and take-up reels and the ink film;

a second cassette for accommodating, at least, the second supply and take-up reels and the intermediate recording medium; and an opening section defined in a chassis for detachably inserting both the first and second cassettes on the chassis, the opening section being defined with first and second opening sections, the first opening section defining a curved line opening section formed along an outer curved line of each of the first and second cassettes, the second opening section defining a straight line opening section formed along an extended path of each of the ink film and the intermediate recording medium, wherein the ink image is formed on the intermediate recording medium by transporting the intermediate recording medium and the ink film closely attached to each other to the first heating section and by heating the ink of the ink film with the first heating section, and the ink image formed on the intermediate recording medium is transferred to the recording medium by transporting the intermediate recording medium to the second heating section and by heating the intermediate recording medium with the second heating section.

* * * * *